US010137567B2

(12) United States Patent
Chen (10) Patent No.: US 10,137,567 B2
(45) Date of Patent: Nov. 27, 2018

(54) INVENTORY ROBOT (71) Applicant: Toyota Motor Engineering & Manufacturing North America, Inc., Erlanger, KY (US)

(72) Inventor: Tiffany Chen, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 200 days.

(21) Appl. No.: 15/270,980

(22) Filed: Sep. 20, 2016

(65) Prior Publication Data

US 2018/0079081 A1 Mar. 22, 2018

(51) Int. Cl.
*B25J 11/00* (2006.01)
*B25J 9/00* (2006.01)
*G06Q 10/08* (2012.01)

(52) U.S. Cl.
CPC .......... *B25J 9/0003* (2013.01); *G06Q 10/087* (2013.01); *Y10S 901/01* (2013.01)

(58) Field of Classification Search
CPC ........ B25J 9/1697; B25J 9/163; B25J 9/1671; B25J 11/0005; Y10S 901/01; Y10S 901/46; Y10S 901/47; G05B 2219/39451; G05B 2219/39466; G05B 2219/40116; G05B 2219/40099; G05B 2219/40409; G05B 2219/40413; G05B 2219/40174; G06K 9/2081; G06K 9/6255; G06K 9/4638
USPC .... 700/245, 257, 259, 250, 258, 264; 901/2, 901/3, 31; 382/155
See application file for complete search history.

(56) References Cited

U.S. PATENT DOCUMENTS

| 7,693,757 | B2 | 4/2010 | Zimmerman |
| 7,720,572 | B2 | 5/2010 | Ziegler et al. |
| 8,140,188 | B2 | 3/2012 | Takemitsu et al. |
| 8,359,122 | B2 | 1/2013 | Koselka et al. |
| 8,364,309 | B1 | 1/2013 | Bailey |
| 9,120,622 | B1 | 9/2015 | Elazary et al. |
| 9,205,886 | B1 | 12/2015 | Hickman et al. |
| 9,740,895 | B1* | 8/2017 | Liu ........................ G06Q 10/00 |
| 2003/0154141 | A1* | 8/2003 | Capazario ............ G06Q 10/087 705/26.1 |

(Continued)

OTHER PUBLICATIONS

"Indoor Localisation of Humans, Objects, and Mobile Robots with RFID Infrastructure" Koch 2007.

(Continued)

*Primary Examiner* — Dalena Tran
(74) *Attorney, Agent, or Firm* — Snell & Wilmer LLP (57) ABSTRACT A robot includes a camera for detecting image data in an area, a memory for storing an object location of objects, an input device for receiving user input, and a robot controller. The robot controller can determine that an object is a desired object to track based on user input or previously detected image data indicating that the desired object has been previously manipulated. The robot controller can also determine an identifier of the desired object based on at least one of a comparison of the image data to a database of objects and identifiers or an identifier received via the input device. The robot controller can also determine a current location of the desired object based on the image data and update the object location of the desired object to include the current location of the desired object.

20 Claims, 10 Drawing Sheets

(56) References Cited

U.S. PATENT DOCUMENTS

| | | | |
|---|---|---|---|
| 2010/0103106 A1* | 4/2010 | Chui | G06F 3/017 |
| | | | 345/166 |
| 2014/0207280 A1 | 7/2014 | Duffley et al. | |
| 2014/0247116 A1 | 9/2014 | Davidson | |
| 2015/0009073 A1 | 1/2015 | Keller, III | |
| 2015/0375398 A1 | 12/2015 | Penn et al. | |

OTHER PUBLICATIONS

"Care-O-bot II Development of a Next Generation Robotic Home Assistant" Graf et al.; 2004.
"Web-Enabled Robots" Tenorth et al.; 2011.
"Sensor/Actuator Networks in Smart Homes for Supporting Elderly and Handicapped People" Dengler et al.; 2007.

* cited by examiner

| OBJECT IDENTIFIER | LOCATION | LAST TOUCHED BY | BEHAVIOR | HOT? |
|---|---|---|---|---|
| WHITE CUP | IN DISHWASHER | MARY | ASSOCIATED WITH MARY | |
| BLUE CUP | IN DISHWASHER | MARY | ASSOCIATED WITH TOM | |
| MARY'S KEYS | ISLAND COUNTER | TOM | REQUESTED AT 7 AM WEEKDAY MORNINGS | YES |
| TOM'S KEYS | MASTER BATHROOM COUNTER | TOM | REQUESTED AT 8 AM WEEKDAY MORNINGS | YES |
| MARY'S MOBILE PHONE | MARY'S POCKET | MARY | | YES |
| TOM'S MOBILE PHONE | ON LEDGE BY SOFA | TOM | | YES |
| ... | ... | ... | ... | ... |

INVENTORY ROBOT

BACKGROUND

1. Field

The present disclosure relates to a system and a method for automatically detecting and storing locations of objects within a predetermined area and providing feedback to a user based on the stored locations.

2. Description of the Related Art

As technology advances, robots are becoming more sophisticated and can perform functions they were not previously capable of. One such way in which robots are advancing is that they are being designed to provide assistance to individuals. For example, robots have been designed to provide nursing care to the elderly, to create music, and to converse with humans.

There are still functions for which robots are not yet designed to provide assistance. One such example is that people may lose track of where some of their belongings are located. This is especially undesirable when a person is in a rush and cannot find a necessary object, such as car keys.

There are some systems that have been designed to keep track of personal objects. For example, one such system includes a receiver to be connected to each object to be tracked. The system also includes a remote control that can wirelessly connect to the receiver. A user may use the remote control to transmit a signal to the receiver causing it to make a sound. The user may find the object by following the sound generated by the receiver. This type of system, however, may be undesirable as it requires the user to place the receiver on each object to track, making the objects relatively bulky. The systems also require the user to keep track of the remote electronic device.

Thus, there is a need in the art for systems and methods for providing a robot that can take an inventory of an area and provide information regarding current locations of objects.

SUMMARY

Described herein is a robot for taking inventory of an area. The robot includes a camera designed to detect image data corresponding to a plurality of objects in the area. The robot also includes a memory designed to store an object location of at least some of the plurality of objects. The robot also includes an input device designed to receive user input. The robot also includes a robot controller coupled to the camera, the memory, and the input device. The robot controller is designed to determine that an object is a desired object to keep track of when at least one of the user inputs indicates that the object is the desired object or previously detected image data indicates that the desired object has been previously manipulated. The robot controller is also designed to determine an identifier of the desired object based on at least one of a comparison of the image data to a database of objects and identifiers, or an identifier received via the input device. The robot controller is also designed to determine a current location of the desired object based on the image data. The robot controller is also designed to update the object location of the desired object to include the current location of the desired object.

Also described is a robot for storing locations of objects. The robot includes a camera for detecting image data corresponding to a plurality of objects in an area. The robot also includes a memory for storing an object database including identifiers and locations of at least some of the plurality of objects. The robot also includes an input device for receiving a request to provide a location of a desired object. The robot also includes a robot actuator for actuating the robot within the area. The robot also includes an output device for outputting data. The robot also includes a robot controller coupled to the camera, the memory, the input device, and the robot actuator. The robot controller is designed to control the robot actuator to cause the robot to move within the area and to determine a current location of the desired object based on the image data. The robot controller is also designed to update the object database to include the current location of the desired object as the current location of the desired object is determined. The robot controller is also designed to control the output device to output data indicating the current location of the desired object in response to receiving the request to provide the location of the desired object.

Also described is a method for taking inventory of an area by a robot. The method includes detecting, by a camera, image data corresponding to a plurality of objects in the area. The method also includes storing, by a memory, an object location of at least some of the plurality of objects. The method also includes determining, by a robot controller, that an object is a desired object to keep track of when at least one of user inputs indicates that the object is the desired object or previously detected image data indicates that the desired object has been previously manipulated. The method also includes determining, by the robot controller, an identifier of the desired object based on at least one of a comparison of the image data to a database of objects and identifiers or an identifier received via an input device. The method also includes determining, by the robot controller, a current location of the desired object based on the image data. The method also includes updating, by the robot controller, the object location of the desired object to include the current location of the desired object.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present invention provides robots, systems and methods to be performed by robots for taking an inventory of a predetermined area and providing feedback regarding the inventory. In particular, the robots detect and store current locations of certain objects and can inform users of the current locations of the objects when requested. An exemplary robot includes sensors, such as a camera or a radar device, that can detect a current position of an object. The robot also includes a memory for storing the current locations of the objects. The robot also includes a robot controller that can analyze the data from the sensors to determine current locations of the objects and can also update the memory with the current locations of the objects.

The robots, systems and methods disclosed herein provide several benefits and advantages such as informing users of current locations of desired objects. This saves time for the user because the user can simply ask the robot where an object is rather than spend time looking for the object. The robots can also retrieve the object for the user, further saving time for users. The robots can advantageously learn which items are most important to the user, referred to as "hot" items, and can provide additional information regarding the "hot" items. For example, the robots can provide information to a user when such items are moved or manipulated by another person. The robots, systems and methods provide additional benefits and advantages such as learning interactions between humans and objects. For example, when a user requests a cup, the robot can learn to bring the user his favorite cup. The robots can also advantageously predict a current location of an object if the object is no longer at the stored location. For example, the robots can analyze an environment and predict that a set of keys has fallen underneath a couch based on the previously detected location of the keys relative to the couch.

Figure 1:
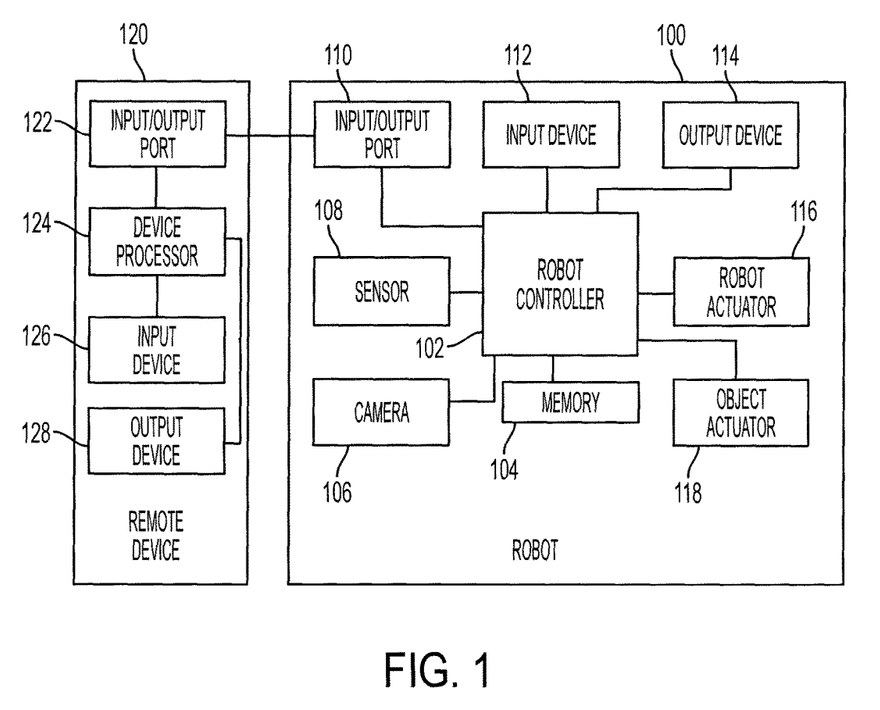
FIG. 1 is a block diagram of a robot for taking an inventory of an area and for providing feedback regarding locations of objects in the area according to an embodiment of the present invention.

FIG. 1 illustrates a robot 100 capable of taking an inventory of an area and determining information regarding objects in the area. The robot 100 includes a robot controller 102 and a memory 104. The robot controller 102 may include any logic device capable of performing calculations and/or controlling electrical or mechanical features of the robot 100. The memory 104 may include any memory capable of storing non-transitory data including instructions to be performed by the robot controller 102.

The robot 100 may also include a camera 106 and another sensor 108. The camera 106 may include any camera or cameras capable of detecting image data corresponding to an environment of the robot 100. For example, the camera 106 may detect the location of a desired object in the environment relative to another object.

The sensor 108 may include any sensor such as, for example, an infrared sensor, a radar sensor, a LIDAR sensor, a radio frequency identification (RFID) sensor, or the like. The sensor 108 may also be used to detect data corresponding to an object in the area. For example, the infrared sensor may detect heat emanating from an object. The radar sensor or the LIDAR sensor may detect the presence of objects based on reflected waves. The RFID sensor may detect data transmitted by an RFID tag placed on a desired object.

The robot 100 may also include an input/output port 110. The input/output port 110 may be capable of communicating with at least one of the cloud or a remote device 120 via Wi-Fi, Bluetooth, Ethernet, or any other wired or wireless protocol. The robot controller 102 may communicate with the remote device 120 via the input/output port 110. For example, the remote device 120 may be a smart phone having an input/output port 122 and a device processor 124 such that the robot controller 102 may communicate with the device processor 124 via the input/output port 110 and the input/output port 122.

The robot 100 may also include an input device 112. The input device 112 may include any device capable of receiving input. For example, the input device 112 may include a keyboard, a touchscreen, a trackpad, a mouse, a microphone, or the like.

The robot 100 may also include an output device 114. The output device 114 may include any device capable of outputting data. For example, the output device 114 may include a video display, a refreshable braille display, a speaker, or the like.

The robot 100 may also include a robot actuator 116. The robot actuator 116 may include any actuator capable of causing the robot 100 to move from a first location to a second location. For example, the robot actuator 116 may include a motor coupled to one or more wheels such that output from the motor rotates the wheels, causing the robot 100 to move. As another example, the robot actuator 116 may include a hydraulic, pneumatic, or electric actuator configured to operate in such a way that the robot 100 can "walk" in a similar manner as a human or an animal.

The robot 10Q may also include an object actuator 118. The object actuator 118 may include any actuator capable of manipulating an object in the environment of the robot 100. For example, the object actuator 118 may include one or a combination of a hydraulic actuator, a pneumatic actuator, an electric actuator, or the like. The object actuator 118 may be configured in such a way as to be capable of grasping, lifting, rotating, or otherwise manipulating an object.

The robot 100 may be capable of taking an inventory of a predetermined area. For example, the robot 100 may be capable of taking an inventory of an office space, a house, a single floor of a house, a cabin of a vehicle, or the like. The camera 106 and/or the sensor 108 may detect one or more objects within the predetermined area. The robot controller 102 may receive the image data from the camera 106 and/or the data from the sensor 108 and determine a location of the one or more objects within the predetermined area. The robot controller 102 may then update a database in the memory 104 with the current location of the one or more objects. Thus, the memory 104 may store up to date locations of the objects within the area.

A user may request to know the current location of a desired object. In that regard, the user may provide input via the input device 112 requesting the current location. For example, the input device 112 may be a microphone and the request may include a speech command such as "where are my keys?" After finding the current location of the desired object by searching the memory 104, the robot controller 102 may output data indicating the current location via the output device 114. For example, the output device 114 may include a speaker and the output data may include speech data such as "your keys are on the coffee table."

In some embodiments, the database of locations may be stored on the cloud such that it is accessible by the remote devices. In some embodiments, the remote devices may be capable of accessing the database in the memory 104 of the robot 100. For example, a user of the remote device 120 may wish to learn the current location of one or more desired objects. The user may request, via an input device 126, to learn the current location of the one or more desired objects. The device processor 124 may access the database in the memory 104 via the input/output port 122, the input/output port 110, and the robot controller 102. The device processor 124 may then cause the information in the database to be output via an output device 128. The device processor 124 may cause the output device 128 to output location information regarding a single object or multiple objects. In some embodiments, the device processor 124 may cause the output device 128 to output a map of the area including the locations of the desired objects.

Figure 2:
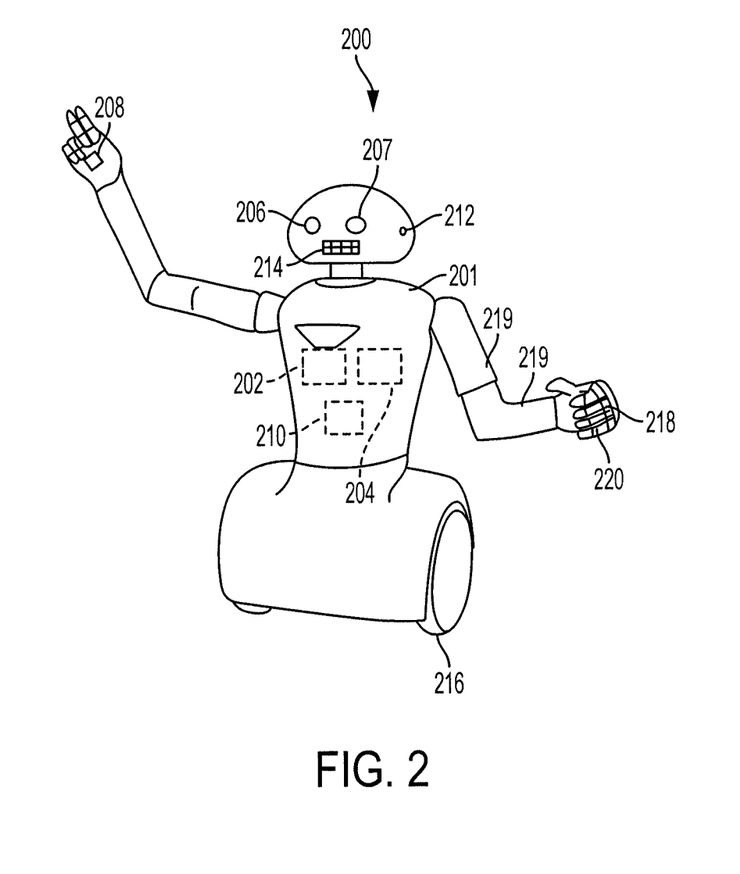
FIG. 2 is a drawing of another robot for taking inventory of an area and for providing feedback regarding locations of objects in the area according to an embodiment of the present invention.

Turning to FIG. 2, an exemplary robot 200 for taking an inventory of an area is shown. One skilled in the art will realize that a robot for taking inventory may have any configuration without departing from the scope of the present disclosure. For example, a robot for taking inventory may include fixed cameras positioned within a house and a processor coupled to the fixed cameras that is designed to determine locations of objects based on image data detected from the fixed cameras.

The robot 200 may include similar features as the robot 100 of FIG. 1. In particular, the robot 200 may include a robot controller 202 and a memory 204. The robot 200 may also include a camera 206, a radar sensor 207, and an RFID sensor 208. The camera 206 may function in a similar manner as the camera 106 of FIG. 1.

The radar sensor 207 may generate a radar wave and receive the reflected radar wave. Based on the reflected radar wave, the robot controller 202 may determine characteristics of an object in the environment such as a size, a shape, a location, or the like. The RFID sensor 208 may detect data from an RFID tag on an object. For example, as the robot 200 passes an object having an RFID tag, the RFID sensor 208 may detect the RFID tag. The RFID tag may include information such as an identifier of the object, an owner of the object, or the like. The RFID sensor 208 may also be capable of detecting a location of the RFID tag relative to the robot 200. Thus, based on the data from the RFID sensor 208, the robot controller 202 may be capable of determining an identity and a location of objects having an RFID tag.

The robot 200 may also include a Wi-Fi port 210 capable of transmitting and receiving messages using a Wi-Fi signal. In that regard, the robot 200 may communicate with the cloud and/or with other devices via the Wi-Fi port 210.

The robot 200 may also include a microphone 212. The microphone 212 may detect speech data from a user corresponding to instructions or requests. In some embodiments, the microphone 212 may also detect additional audio data from the environment. For example, the microphone 212 may detect a barking dog. The robot controller 202 may be capable of identifying the presence of the dog or an identity of the dog based on the barking. The robot controller 202 may also determine a location of the dog relative to the robot 200 via the audio data corresponding to the barking. Thus, the robot controller 202 may identify and determine the location of the dog via the detected audio data.

The robot 200 may also include a speaker 214. The speaker 214 may output audio data based on instructions from the robot controller 202. For example, the speaker 214 may output a current location of a desired object based on a request received by the microphone 212.

The robot 200 may also include a robot actuator 216. As shown in FIG. 2, the robot actuator 216 includes a motor (not shown) and a pair of wheels. The motor may convert electricity into mechanical energy which in turn may provide torque to the wheels, thus turning the wheels and moving the robot 200 from a first location to a second location.

The robot 200 may also include an object actuator 218. As shown in FIG. 2, the object actuator 218 includes multiple actuators 219 coupled to end effectors 220. The multiple actuators 219 may place the end effectors 220 near a desired object. The end effectors 220 may grasp the desired object. The multiple actuators 219 may again move the end effectors 220 to place the desired object near a desired location. The end effectors 220 may then release the desired object such that it is positioned in the desired location.

It may be undesirable for the robot 200 to track every object within a predetermined area. In turn, it may be desirable for the robot 200 to learn which objects may be important to users and to track only these objects. In that regard and referring to FIG. 3, a method 300 is shown up for determining which objects for a robot to track. The method 300 may be performed by a robot controller such as the robot controller 102 of FIG. 1 or the robot controller 202 of FIG. 2.

Figure 3:
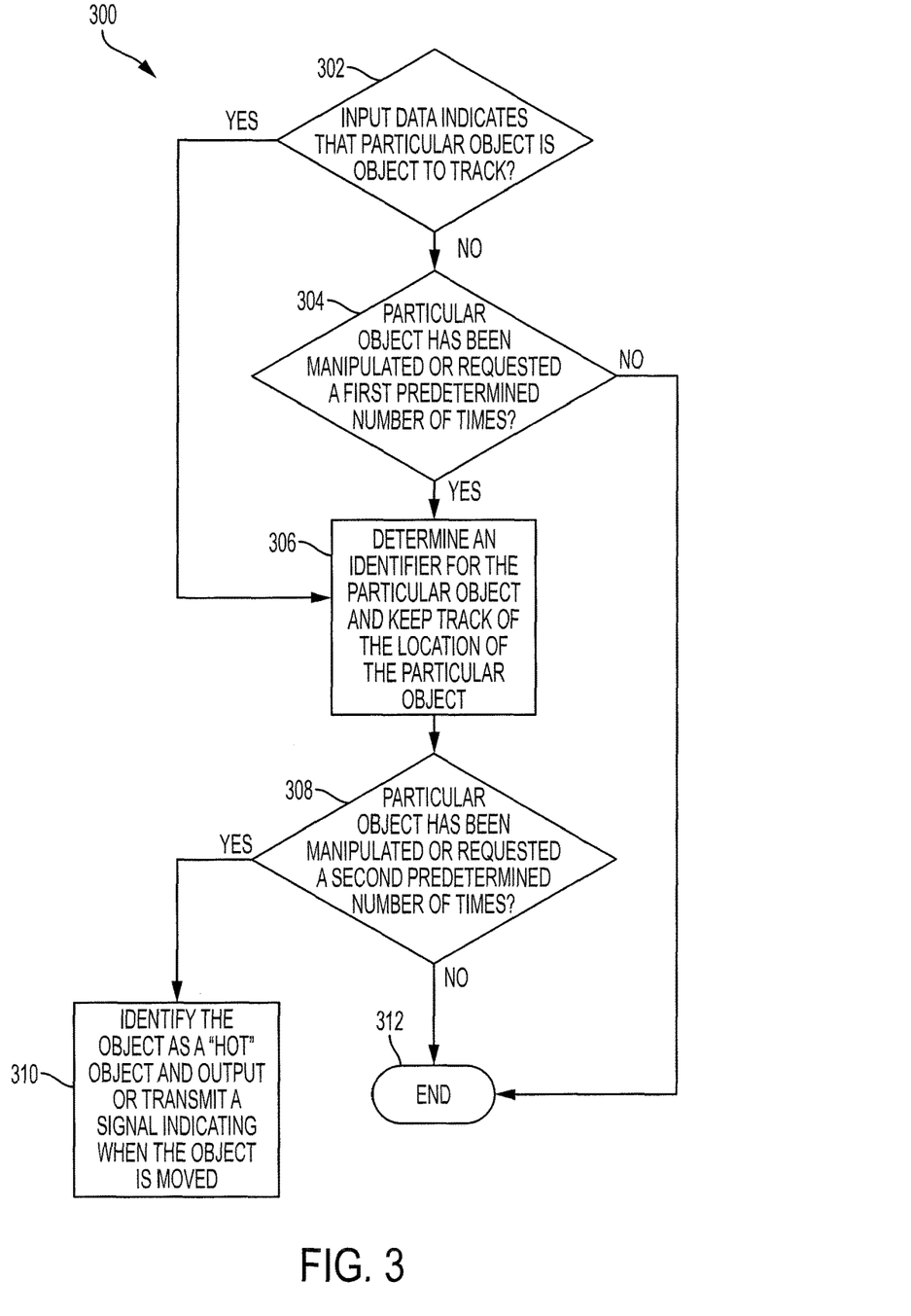
FIG. 3 is a flowchart illustrating a method to be performed by a robot for determining whether an object is an object to track within an area according to an embodiment of the present invention.

The method 300 begins at block 302 where the robot controller determines whether input data has been received that indicates that a particular object is an object to track. The input data may include an instruction by a user that the robot should keep track of the object. For example, the user may speak a command such as "keep track of this" while pointing at a particular object. As another example, the user may speak a command such as "keep track of my keys." In the second example, the robot may compare detected objects in the environment to images of keys and identify the user's keys based on such comparison.

If the input data indicates that the object should be tracked, the method 300 proceeds to block 306. In block 306, the robot controller may determine an identifier for the particular object and keep track of the locations of the particular object.

The robot controller may determine the identifier for the particular object in various ways. For example, the robot controller may compare image data of the object to a database containing images and identifiers for the images. When a match between the image data of the object and an image in the database is found, the robot controller may apply the identifier from the database to the object. As another example, a user may provide an identifier of the object to the robot controller. For example, the user may point at an object and say "these are my keys." The robot controller may then store the image data of the keys along with the identifier "my keys." As yet another example, an object to keep track of may include an RFID tag. The robot controller may determine the identifier of the object based on data transmitted by the RFID tag.

After determining that the object should be tracked, the robot controller may track locations of the object within the area. This function will be described below with reference to FIG. 4 in more detail.

In block 304, the robot controller determines whether a particular object has been manipulated or requested a predetermined number of times. In some embodiments, the user may request the robot to identify the location of a particular object or to bring the particular object to the user. For example, the user may say "robot, where are my keys?" or "bring me my keys." The robot controller may then note that the keys are an object to keep track of. In some embodiments, the robot will begin to track the object after one request and, in some embodiments, may begin to track the object after multiple requests.

In some embodiments, the data detected by the robot may indicate that the user has manipulated a particular object a predetermined number of times. For example, image data may indicate that a user repeatedly picks up a cup. After the image data indicates that the user picked up the cup a predetermined number of times (such as one time, three times, five times, or the like), the robot controller may then note that the cup is an object to keep track of and/or is a favorite cup (or "hot" object) of the user.

If the robot controller determines that the particular object has been manipulated or requested the predetermined number of times then the method 300 may proceed to block 306. Otherwise, the method 300 may end in block 312.

After the robot controller determines an identifier for the object and determines that the object should be tracked, the robot controller may determine whether the particular object has been manipulated or requested a second predetermined number of times. For example, a user may manipulate or request the location of keys frequently. In that regard, after the user has manipulated the keys or requested the location of the keys a certain number of times, the robot controller may determine that the keys are an object frequently used by the user and, thus, are a "hot" object.

In that regard, in block 310, the robot controller may identify the object as a "hot" object. The robot controller may be designed to take separate actions with regard to "hot" objects as opposed to other objects for the robot to track. In some embodiments, the robot controller may be designed to notify the user each time a "hot" object is manipulated or moved from a current location. For example, the robot controller may transmit a message to a mobile device of the user indicating that the "hot" object has been moved along with a current location of the "hot" object. In some embodiments, the robot controller may cause an output device of the robot to output data indicating that the "hot" object has been moved and/or indicating a current location of the "hot" object.

Figure 4:
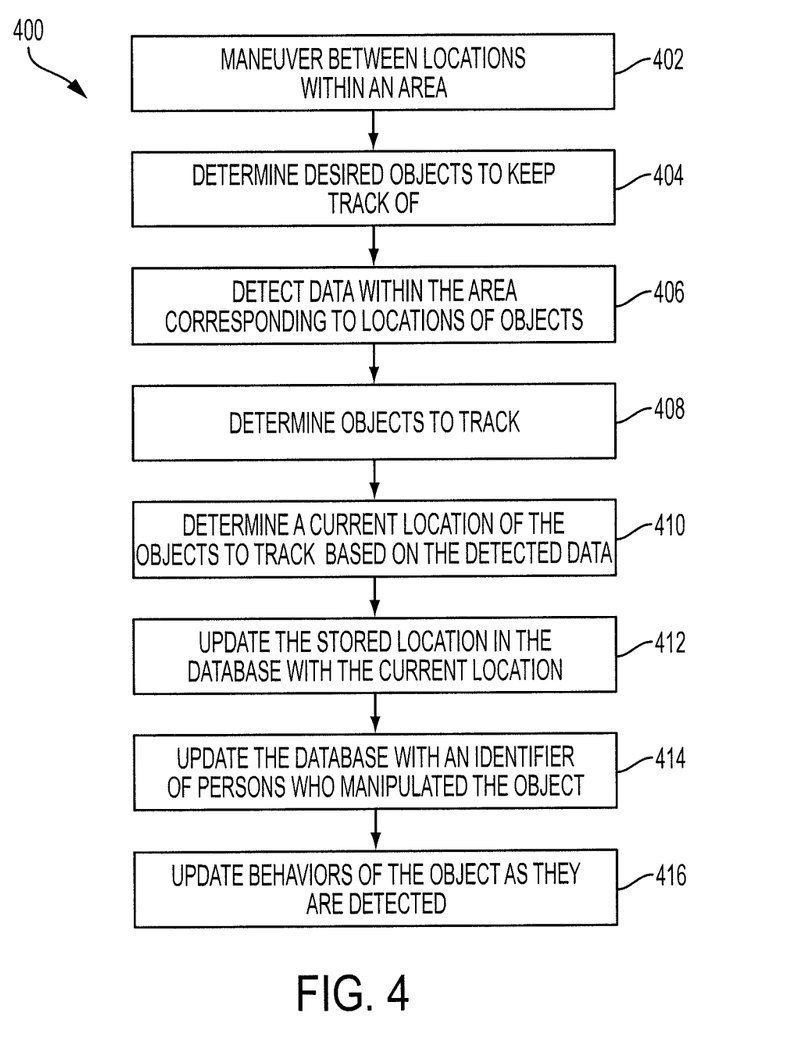
FIG. 4 is a flowchart illustrating a method to be performed by a robot for updating a database that includes labels of objects and detected locations of the objects within an area according to an embodiment of the present invention.

Turning now to FIG. 4, after determining which objects to track, the robot may track and record the locations of the objects using a method 400. The method 400 begins at block 402 where the robot controller may cause the robot to maneuver between locations within an area. For example, the robot controller may control a motor of the robot to generate torque, thus causing wheels of the robot to rotate, thus propelling the robot.

In some embodiments, the method 400 may be performed concurrently with the method 300 of FIG. 3. In that regard, in block 404, the robot controller may continue to determine objects to track within the area. This may be performed in the same way as described with reference to FIG. 3.

In block 406, sensors of the robot may detect data within the area that correspond to objects and their locations. The data may include image data, radar data, RFID data, or the like. As the robot maneuvers within the area, the sensors of the robot may continuously detect data corresponding to the environment and, thus, objects within the environment. In some embodiments, the robot may continuously move within the area. In some embodiments, the robot may periodically move within the area. For example, the robot may maneuver through the area every hour, every three hours, every six hours, or the like. In some embodiments, the robot may be stationary and thus not maneuver through the area.

In block 408, as the sensors of the robot detect the data corresponding to the environment, the robot controller may identify which objects are objects to track by comparing the objects to the stored data.

In block 410, the robot controller may determine the current location of the objects to track based on the detected data. If the data is detected via a camera, the robot controller may determine the location of the object to track by comparing the location of the object to stationary references within the area. For example, if the object is a mobile phone, the robot controller may compare the location of the mobile phone to a location of a fixed counter or shelf within the area.

In some embodiments, the robot may also include a GPS unit, an inertial measurement unit, or another device that the robot controller may use to determine a current location and/or orientation of the robot. For example, the current location and/or orientation of the robot may include GPS coordinates, other types of coordinates, a relative position of the robot, or the like. If the data is detected via a camera, a radar sensor, or an RFID sensor, the robot controller may determine a distance and a direction from the robot to the object based on the detected data and determine the location of the object by comparing the distance and direction from the robot to the object to the current location of the robot.

In block 412, the robot controller may update the database in the memory with the current location of the objects to track. For example, the robot controller may compare the current location of a particular object to a location of the object that is stored in the database. If the current location is the same as the stored location, the robot controller may not update the database. However, if the current location is different from the stored location, the robot controller may replace the stored location with the current location such that the database has a stored location that is up-to-date.

The robot controller may also determine whether detected objects are "hot" objects. The memory may store a "home" location of "hot" objects that corresponds to typical locations of the object. Each "hot" object may include one or more "home" locations. If the detected object is a "hot" object, the robot controller may determine whether the "hot" object is positioned at a "home" location. If the "hot" object is not positioned at a "home" location, then the robot controller may take an additional action. For example, the robot controller may transmit a signal to a device of the user of the "hot" object indicating that the "hot" object is at a location other than its "home" location. In some embodiments, the robot may be designed to return "hot" objects to their "home" locations. In that regard, the robot controller may control the robot actuator and the object actuator to move the "hot" object to its "home" location when the current location of the "hot" object is not the "home" location.

In some embodiments, as the robot is maneuvering within the area, the robot controller may analyze data detected regarding the "home" locations of "hot" objects. If the robot controller determines that a "hot" object is not positioned at its "home" location, the robot controller may take an action. For example, the robot controller may control the robot to transmit or output a signal indicating that the "hot" object is not at the "home" location, and/or it may control the robot to maneuver through the area while detecting data in an attempt to identify the current location of the "hot" object.

As the robot detects data corresponding to the objects, the robot may also detect data corresponding to persons manipulating the objects. In block 414, the robot controller may update the database with identifiers of any person detected manipulating an object. In some embodiments, the robot controller may only update the database with identifiers of persons detected manipulating a "hot" object.

This information may be useful in determining a location of a lost object. For example, if a user places his keys on the counter and later cannot find the keys, the user may ask the robot to identify the current location of the keys. If the current location of the keys is not in the database or is incorrect, the robot may output data indicating the last person to manipulate the keys. Thus, the user may then be able to ask the person about the location of the keys rather than spending time looking for the keys.

In some embodiments, the robot may be capable of learning patterns associated with objects and using such patterns to determine associations between people and objects and/or to determine actions to be taken regarding objects. In block 416, the robot controller may update the database or other portions of the memory with detected behaviors or associations of objects. One such association the robot may learn is an association between objects and people. For example, if the detected data indicates that a first person always uses a white cup and a second person always uses a blue cup, the robot controller may store data indicating that when the first person requests a cup the robot should bring a white cup and when the second person requests a cup the robot should bring a blue cup.

In a similar example, the robot may learn that a first set of keys belongs to a first user and a second set of keys belongs to a second user. If the detected data indicates that the second user has grabbed the first set of keys, the robot may output data or transmit a signal indicating that the second user has grabbed the wrong set of keys.

The robot may also learn certain actions that are taken with regard to a particular object. For example, the robot may learn that a user always places his keys at a certain location on the counter when the user is home. After learning this association, the robot controller may determine when the keys are at a location other than the location on the counter and may move the keys back to the location on the counter.

As yet another example, the robot may learn that a user always requests his child to pick up toys when a certain number of toys are on a floor in a playroom. After learning this pattern, the robot may either place the toys in their home location or request the child to pick up the toys when a certain number of toys are on the floor.

The robot may also learn associations or behaviors of objects relative to time. For example, the robot may determine that a user picks up his keys and leaves the house at 8 o'clock each weekday morning. The robot may ensure that the keys are at their "home" location prior to 8 o'clock and, if not, may move the keys to the "home" location. If the robot notices that the person is still at the house after 8 o'clock on a weekday, the robot may attempt to help the user by bringing the keys to the user to help him leave closer to his desired time.

While the robot may learn associations between objects and people or time and behaviors of objects, the robot may also receive user input indicating such associations or behaviors. For example, a user may provide input data indicating that a first set of keys belong to the user and a second set of keys belong to a friend of the user.

Figure 5:
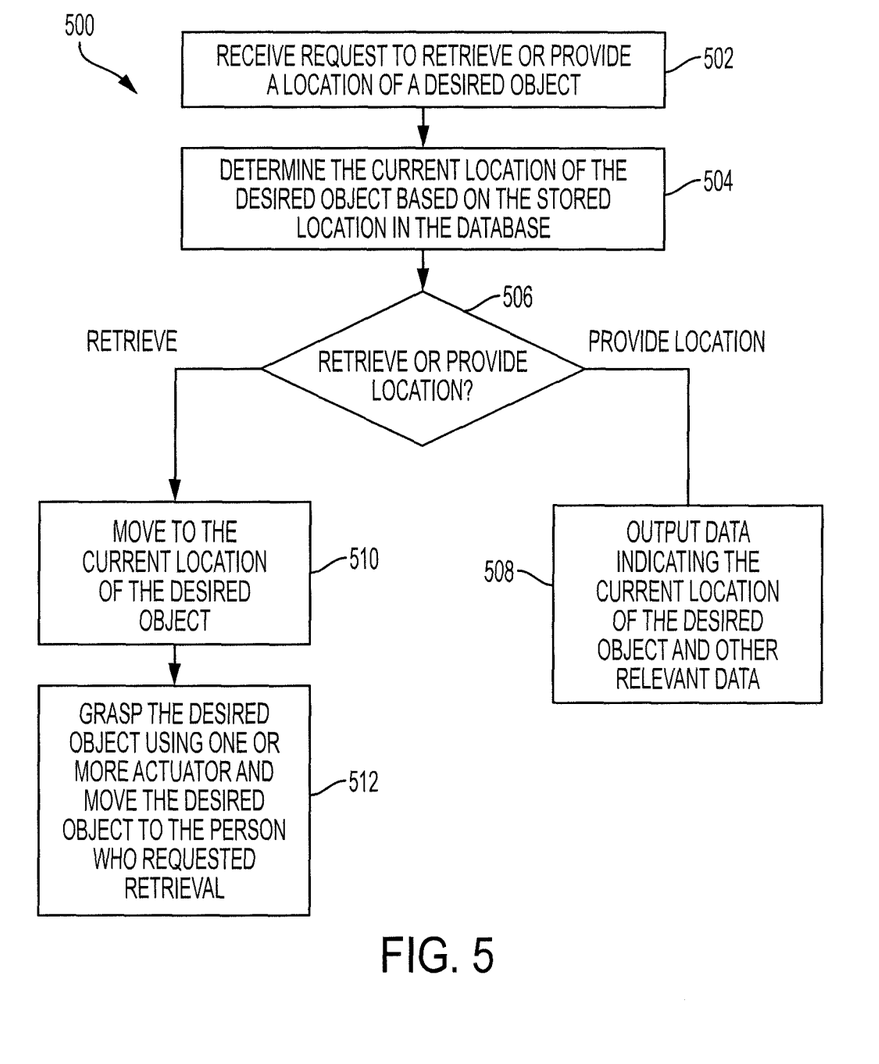
FIG. 5 is a flowchart illustrating a method to be performed by a robot for outputting a current location of a desired object or retrieving the desired object for a user according to an embodiment of the present invention.

Turning now to FIG. 5, the user may occasionally request the robot to retrieve a desired object or to provide a location of the desired object. The robot may handle such a request using a method similar to the method 500. In block 502, the robot may receive a request to retrieve or provide a location of the desired object. For example, the user may request the retrieval or location via the input device of the robot. In some embodiments, the user may request such information using a remote device. In some embodiments, the user may access a visual map of the area including locations of the objects to be tracked. In such embodiments, certain blocks of the method 500 may not be performed.

In block 504, the robot controller may determine the current location of the desired object. In order to determine the current location, the robot controller may access the database in the memory. The robot controller may then compare the received identifier of the object to the identifiers stored in the database. When a match is found, the robot controller may determine that the location in the database associated with the identifier is the current location of the object.

In block 506, the robot controller determines whether it is to retrieve the desired object or provide the current location of the desired object. This may be determined based on an instruction from the user. For example, if the user states "bring me my keys," then the user is requesting for the robot to retrieve the keys. However, if the user asks "where are my keys?" then the user is requesting for the robot to provide the current location of the keys.

If the request is for the robot to provide the current location of the keys then the method 500 proceeds to block 508. In block 508, the robot may output data indicating the current location of the desired object. The robot may output the data using various output devices such as, for example, a speaker, a display, a refreshable braille display, or the like.

The robot may also output the data in various manners. In some embodiments, the robot may output coordinates of the desired object using any coordinate system including GPS coordinates or a coordinate system designed specifically for the area. In some embodiments, the robot may output a location of the desired object relative to another object. For example, the robot may indicate that the keys are on the kitchen counter next to the toaster oven. In some embodiments, the robot may provide walking directions from the user to the desired object. For example, the robot may output data indicating for the user to turn left, walk three steps, and that the desired object will be on the right side of the user.

In block 510, if the robot is to retrieve the desired object, the robot controller may control the robot actuator to move the robot to the current location of the desired object. The robot controller may also at this point verify that the desired object is in the stored location by analyzing the detected data.

In block 512, after moving to the location of the desired object, the robot may grasp the desired object using one or more object actuators. The robot controller may then determine the location of the user who requested the desired object and cause the robot actuator to move the robot to the location of the user. The robot controller may then control the object actuator to release the object onto a surface or into hands of the user, thereby providing the desired object to the user.

In some embodiments, a desired object may not be at the location stored in the memory for various reasons. For example, another user may have the desired object. In some situations, however, the desired object may fall or otherwise move from a location due to non-human forces such as gravity, earthquakes, interference by a pet, or the like. The robot may be designed to predict the location of such objects.

Figure 6:
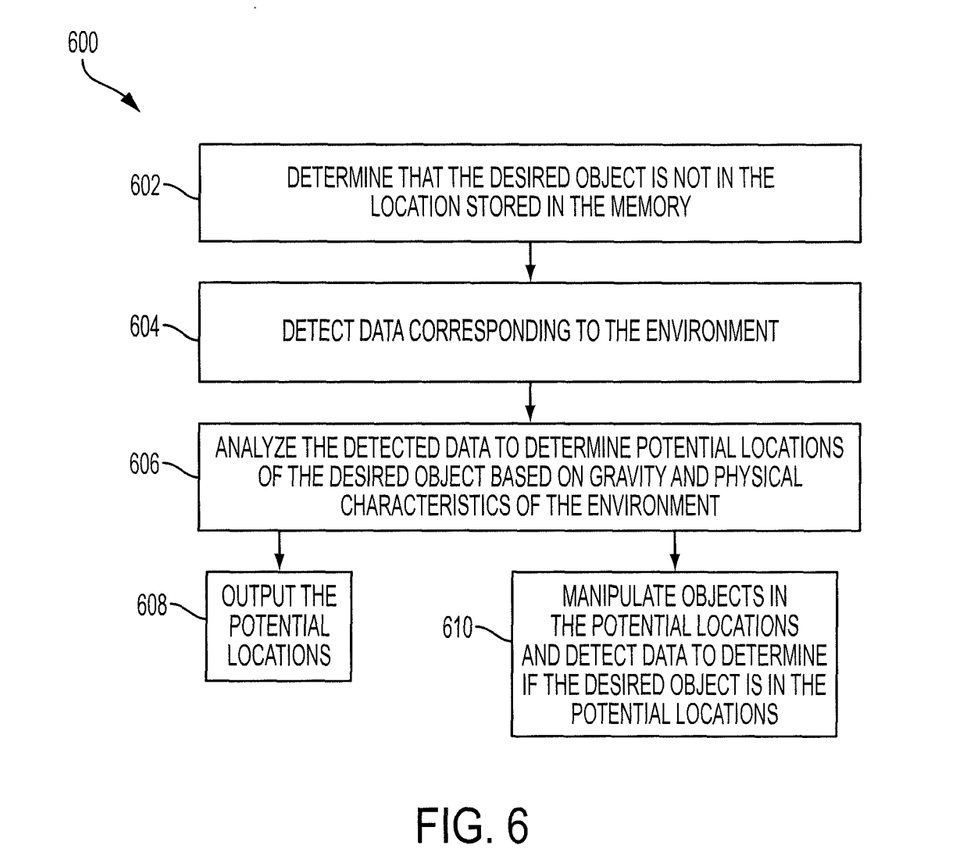
FIG. 6 is a flowchart illustrating a method to be performed by a robot for predicting a location of a desired object when the desired object is not in a previously detected location according to an embodiment of the present invention.

Referring now to FIG. 6, a robot may use a method 600 to determine or predict a current location of a desired object when the desired object is not at the stored location. In block 602, the robot may determine that the desired object is not at the location that is stored in the memory. The robot may make this determination by analyzing detected data regarding the stored location of the desired object. If the object is not detected in the location, then the robot may determine that the desired object is not in the stored location.

In block 604, the robot may detect data corresponding to the environment of the stored location of the desired object. In some embodiments, the robot may detect data within a predetermined distance of the stored location. For example, the robot may detect data within 1 foot of the stored location, within 5 feet of the stored location, within 10 feet of the stored location, or the like. The data may include any type of data detected by the robot such as, for example, RFID data, image data, audio data, radar data, or the like.

In block 606, the robot controller may analyze the detected data to determine predicted locations of the desired object. The robot controller may determine predicted locations of the desired object based on factors such as physical characteristics of the environment, physical characteristics of the object, gravity, or the like.

Physical characteristics of the environment may include, for example, whether the desired object was on a raised platform, whether a pet is present in the environment, whether objects are present below the desired object that may change a trajectory of the desired object, whether wind is present in the environment, whether vibrations are or have been present in the environment, whether surfaces in the area are sufficiently springy to cause the desired object to bounce, or the like.

Physical characteristics of the desired object may include, for example, a size of the desired object, a shape of the desired object, a mass of the desired object, a density of the desired object, whether the desired object is springy, or the like.

The robot controller may analyze these characteristics to predict the current location of the desired object. For example, if wind is blowing and the desired object is relatively light then the robot controller may predict that the desired object will be downwind from its stored location. As another example, if the desired object was on a ledge behind a couch, the robot controller may predict that the desired object has fallen from the ledge and is behind or under the couch.

In block 608, the robot may output the predicted locations of the desired object. In some embodiments, it may be desirable for the robot to verify that the desired object is in one of the predicted locations. Thus, in block 610, the robot may manipulate objects and the predicted locations and continue to detect data to determine whether the desired object is in one of the predicted locations. The robot may move items out of the way of the predicted locations and/or maneuver itself to get a better view of the predicted locations. The robot may analyze data at each of the predicted locations to determine whether the desired object is present. In some embodiments, it may be desirable for the robot to retrieve the desired object. In these embodiments, the robot may retrieve the desired object when found and either move the object to the user or return the object to the stored location.

In some embodiments, such as if the object is a hot object, the robot may automatically predict locations of objects and return the objects to the "home" locations when the robot detects that the object is not at the stored location.

Figure 7:
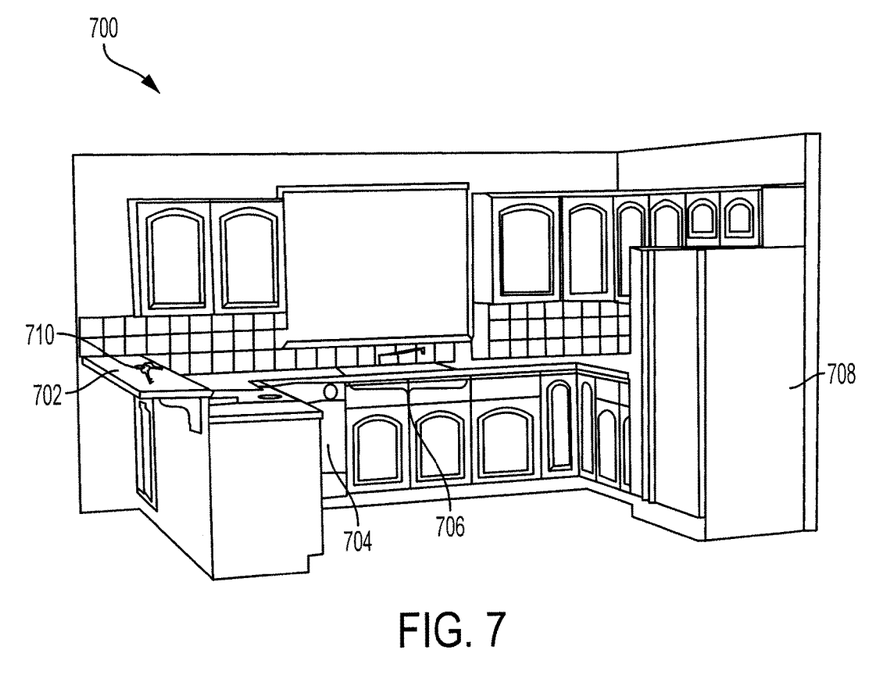
FIG. 7 is a drawing of a kitchen illustrating an example of how a robot can take an inventory of objects to track using a method similar to the method of FIG. 4 according to an embodiment of the present invention.

Turning now to FIG. 7, an example of a robot updating a current location of an object to be tracked is shown. FIG. 7 illustrates a kitchen 700 having an island counter 702, a dishwasher 704, a sink 706, and a refrigerator 708 as stationary objects. The robot may not track the locations of these objects because they are stationary. However, in some embodiments, the robot may learn the names and/or locations of these objects in order to provide relative locations of desired objects.

Figure 8:
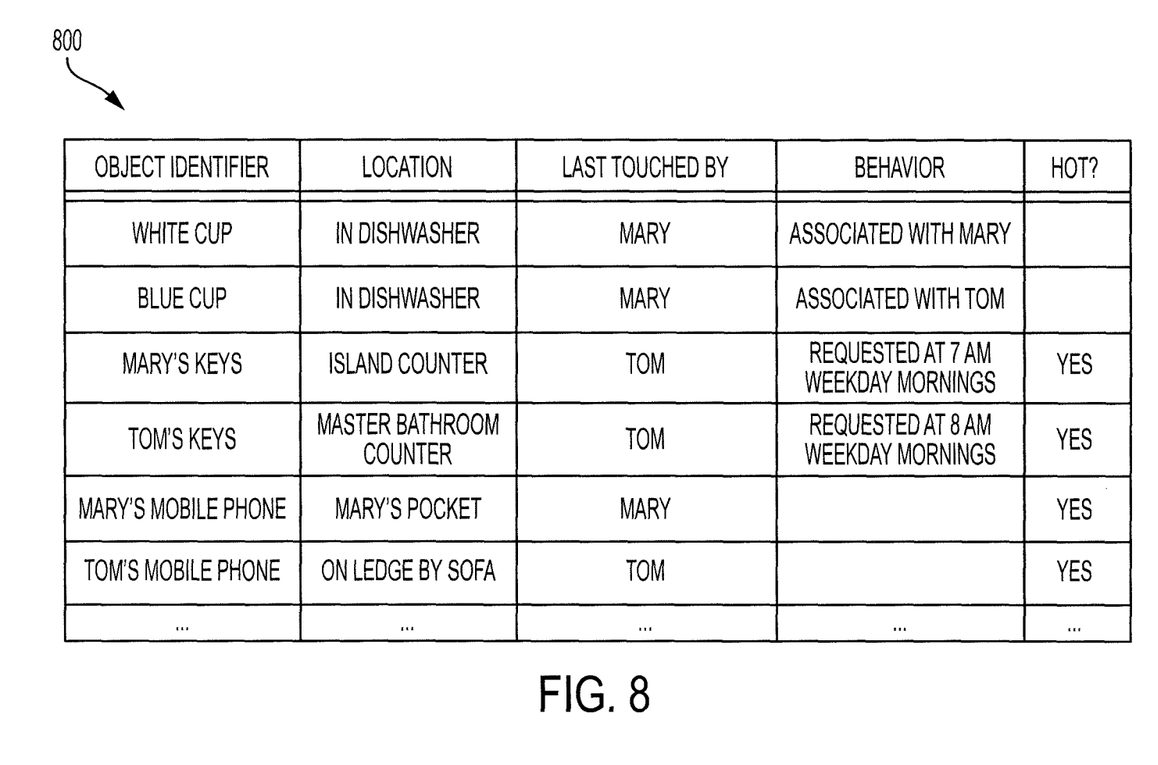
FIG. 8 is a chart illustrating an exemplary database including identifiers of objects, detected locations of the objects, an identifier of the last person detected touching the object, a learned behavior of the object, and whether the object is a "hot" object according to an embodiment of the present invention.

As the robot maneuvers through the kitchen 700, the robot may detect a set of keys 710 belonging to Mary positioned on the island counter 702. Referring to FIGS. 7 and 8, an exemplary database 800 of objects to track within a home is shown. The objects include a white cup, a blue cup, Mary's keys, Tom's keys, Mary's mobile phone, and Tom's mobile phone. As the robot detects the objects to track, it may update the location in the database 800. Thus, as the robot detects the keys 710, the robot may ensure that the island counter 702 is the location in the database 800 associated with Mary's keys 710.

Referring to FIG. 8, the database 800 may include additional data such as the last person to touch the object, learned behaviors of the object, and whether the object is a "hot" object. For example, the database 800 indicates that Mary was the last person to touch both the white cup and the blue cup. The database 800 also indicates that the white cup is associated with Mary and the blue cup is associated with Tom. Thus, if Tom requests a cup from the robot, the robot controller may determine that Tom prefers a blue cup over a white cup and may bring Tom a blue cup. Furthermore, the database 800 indicates that both sets of keys and both mobile phones are "hot" objects.

Figure 9:
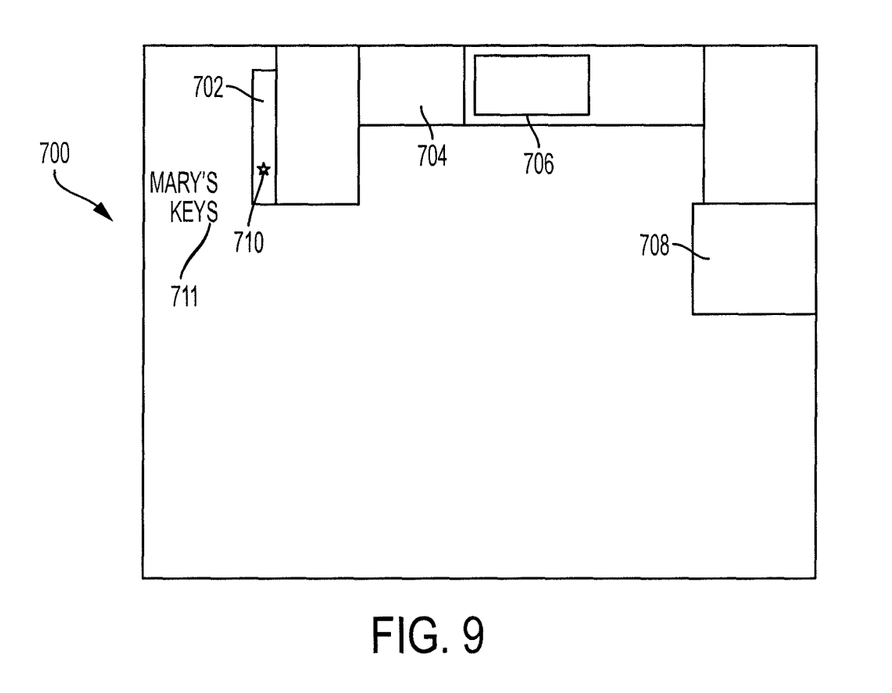
FIG. 9 is a drawing of a map of the kitchen of FIG. 7 illustrating an example of how a robot may output data indicating a current location of a desired object according to an embodiment of the present invention.

As described above, a map of the area may be output on a display of the robot or a display of a remote device. Referring to FIG. 9, an exemplary map of the kitchen 700 that may be output by the robot or a mobile device is shown. The map illustrates the various objects in the kitchen 700 such as the island counter 702, the dishwasher 704, the sink 706, and the refrigerator 708. Furthermore, the map shows the location of Mary's keys 711 at their current location within the kitchen 700.

Figure 10:
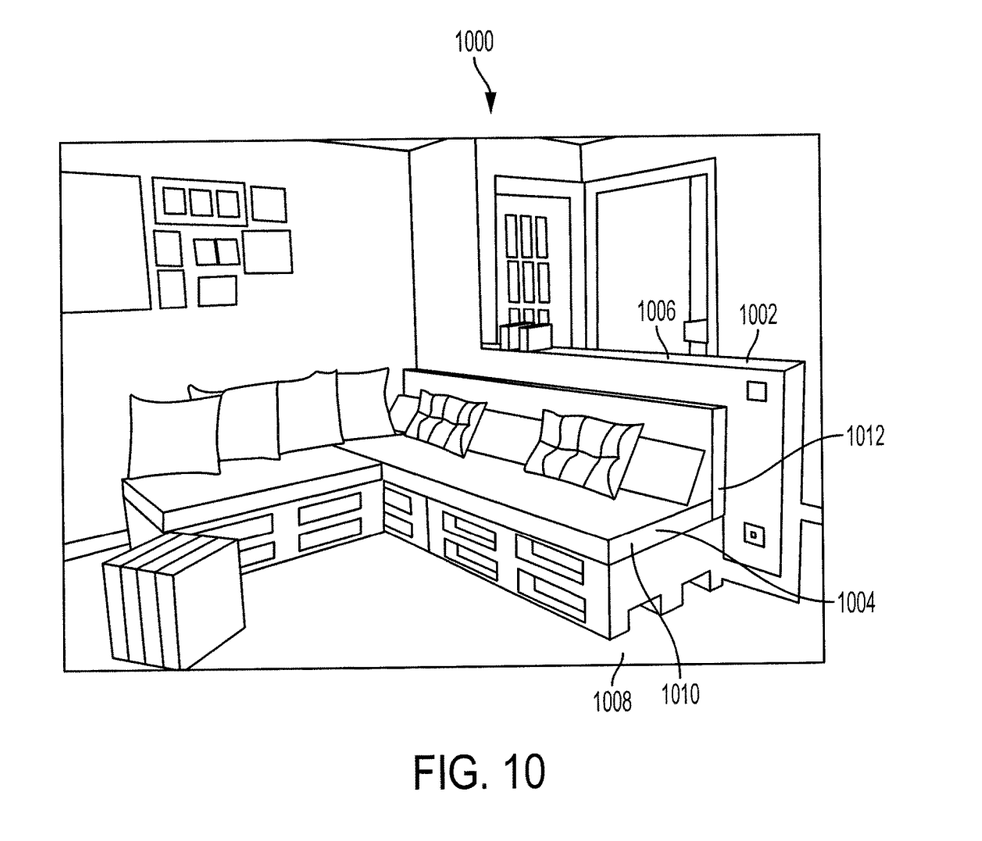
FIG. 10 is a drawing of a living room illustrating an example of how a robot may predict a current location of an object that is not at a previously detected location using a method similar to the method of FIG. 6 according to an embodiment of the present invention.

Turning now to FIG. 10, an example of how a robot may predict a location of an object based on a previously stored location of the object is shown. FIG. 10 illustrates a living room 1000 that includes a ledge 1002 and a couch 1004. The robot may have recorded the last known location of a mobile phone at a stored location 1006 on the ledge 1002. The robot controller may determine, based on currently detected image data, that the mobile phone is no longer at the location 1006.

The robot controller may then analyze features of the environment to predict the current location of the mobile phone. For example, the robot controller may determine that the ledge 1002 is raised above the floor 1008 and that gravity may have caused the mobile phone to fall towards the floor 1008. Further, the robot controller may determine that the couch 1004 is adjacent to the ledge 1002 and that it has a horizontal portion 1010 and a vertical portion 1012. The robot controller may also determine that the keys may fit between the ledge 1002 and the vertical portion 1012. Based on the effects of gravity, the robot controller may predict that the keys fell between the ledge 1002 and the vertical portion 1012 and are positioned beneath the horizontal portion 1010. In some embodiments, the robot may detect data corresponding to an area between the horizontal portion 1010 and the floor 1008. In some embodiments, the robot may output data indicating that it predicts the keys are positioned between the horizontal portion 1010 and the floor 1008.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A robot for tracking or locating objects within an area comprising:
    a camera configured to detect image data of a plurality of objects within the area;
    a memory configured to store an identifier and an object location for an object of the plurality of objects; and
    a robot controller coupled to the camera and the memory and configured to:
        determine that the object among the plurality of objects is to be tracked based on a manipulation of the object or a request to manipulate the object,
        associate the object with the identifier
        determine a current location of the object based on the image data, and
        update, using the identifier and in the memory, the object location for the object to include the current location to keep track of the object.

2. The robot of claim 1 further comprising:
    an output device coupled to the robot controller and configured to output data;
    an input device configured to receive user input, wherein the user input includes a request to locate the object;
    wherein the robot controller is further configured to determine the current location of the object based on the object location stored in the memory and to cause the output device to output data indicating the current location of the object.

3. The robot of claim 2 wherein at least one of the user input or the image data indicates that the object is not at the stored object location and wherein the robot controller is further configured to predict the current location of the object based on characteristics of surrounding objects in the area.

4. The robot of claim 1 further comprising a display coupled to the robot controller and wherein the robot controller is further configured to control the display to output a map of the area including the object location of the object.

5. The robot of claim 1 wherein the robot controller is further configured to:
    identify a hot object as one of the plurality of objects whose location changes frequently or is requested frequently, and
    output or transmit a message indicating that the hot object has been moved when the image data indicates that the hot object has been moved.

6. The robot of claim 1 wherein the image data indicates that the object being object has been moved to a new location by another object or person and the robot controller is further configured to store the new location of the object and an identifier of the other object or person in the memory.

7. The robot of claim 1 further comprising at least one actuator coupled to the robot controller and configured to manipulate objects and wherein:
    the memory is further configured to store behaviors of the object; and
    the robot controller is further configured to control the at least one actuator to move the object based on the stored behaviors of the object and the detected image data.

8. The robot of claim 1 further comprising:
    an input device configured to receive user input; and
    at least one actuator coupled to the robot controller and configured to manipulate objects and wherein the user input includes a request for the object and the robot controller is further configured to control the at least one actuator to move the object from the current location to a user location in response to the request for the object.

9. The robot of claim 1 further comprising a radio frequency identification (RFID) sensor configured to detect a RFID tag of the object and wherein the robot controller is further configured to determine the current location of the object based on the detected RFID tag of the object.

10. A robot for tracking or locating object comprising:
    a camera configured to detect image data of a plurality of objects within an area;
    a memory configured to store an object database including an identifier and a location for an object of the plurality of objects;
    an input device configured to receive a request to provide a location of the object;
    a robot actuator configured to move the robot within the area;
    an output device configured to output data; and
    a robot controller coupled to the camera, the memory, and the robot actuator and configured to:
        control the robot actuator to cause the robot to move within the area,
        determine that the object of the plurality of objects is to be tracked based on a manipulation of the object,
        associate the object with the identifier,
        determine a current location of the object based on the image data,
        update, using the identifier, the object database to include the current location of the object, and
        control the output device to output data indicating the current location of the object in response to receiving the request to provide the location of the object.

11. The robot of claim 10 wherein at least one of user input or the image data indicates that the object is not at the location of the object stored in the object database and wherein the robot controller is further configured to predict the current location of the object based on characteristics of surrounding objects in the area.

12. The robot of claim 10 further comprising a display coupled to the robot controller and wherein the robot controller is further configured to control the display to output a map of the area including the location of the object.

13. The robot of claim 10 wherein the robot controller is further configured to:
   identify a hot object as an object whose location changes frequently or is requested frequently, and
   output or transmit a message indicating that the hot object has been moved when the image data indicates that the hot object has been moved.

14. The robot of claim 10 further comprising an object actuator coupled to the robot controller and configured to manipulate objects and wherein:
   the memory is further configured to store behaviors of the object; and
   the robot controller is further configured to control the object actuator to move the object based on the stored behaviors of the object and the detected image data.

15. The robot of claim 10 further comprising a radio frequency identification (RFID) sensor configured to detect a RFID tag of the object and wherein the robot controller is further configured to determine the current location of the object based on the detected RFID tag of the object.

16. A method for tracking or locating objects within an area by a robot comprising:
   detecting, by a camera, image data of a plurality of objects within the area;
   storing, by a memory, an identifier and an object location for an object of the plurality of objects;
   determining, by a robot controller, that the object among the plurality of objects is to be tracked based on a manipulation of the object or a request to manipulate the object;
   associating, by the robot controller, the object with the identifier;
   determining, by the robot controller, a current location of the object based on the image data; and
   updating, by the robot controller and using the identifier, the object location of the object to include the current location to keep track of the object.

17. The method of claim 16 further comprising:
   receiving, by an input device, a request to provide the current location of the object; and
   outputting, by an output device, output data indicating the current location of the object.

18. The method of claim 16 further comprising:
   identifying, by the robot controller, a hot object as one of the plurality of objects whose location changes frequently or is requested frequently; and
   outputting or transmitting, by the robot controller, a message indicating that the hot object has been moved when the image data indicates that the hot object has been moved.

19. The method of claim 16 further comprising:
   storing, in the memory, behaviors of the object; and
   controlling, by the robot controller, an actuator of the robot to move the object based on the stored behaviors of the object and the detected image data.

20. The method of claim 16 further comprising:
   detecting, by a radio frequency identification (RFID) sensor, a RFID tag of the object; and
   determining, by the robot controller, the current location of the object based on the detected RFID tag of the object.

* * * * *